United States Patent
Lahr et al.

(10) Patent No.: US 12,094,167 B2
(45) Date of Patent: Sep. 17, 2024

(54) AIRCRAFT CAMERA EXTRINSIC CALIBRATION USING HEAD-UP DISPLAY

(71) Applicant: Rockwell Collins, Inc., Cedar Rapids, IA (US)

(72) Inventors: Weston J. Lahr, Sherwood, OR (US); Richard M. Rademaker, Cedar Rapids, IA (US); Christopher M. Boggs, Gainesville, VA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 365 days.

(21) Appl. No.: 17/475,544

(22) Filed: Sep. 15, 2021

(65) Prior Publication Data
US 2023/0082417 A1    Mar. 16, 2023

(51) Int. Cl.
| | |
|---|---|
| G06T 7/80 | (2017.01) |
| G06T 7/33 | (2017.01) |
| G06T 7/73 | (2017.01) |
| G06V 10/22 | (2022.01) |
| G06V 10/75 | (2022.01) |

(52) U.S. Cl.
CPC ............... *G06T 7/80* (2017.01); *G06T 7/33* (2017.01); *G06T 7/74* (2017.01); *G06V 10/235* (2022.01); *G06V 10/751* (2022.01); *G06T 2207/20101* (2013.01)

(58) Field of Classification Search
CPC ... G06T 7/80; G06T 7/74; G06T 2207/20101; G06T 7/33; G06V 10/235; G06V 10/751
See application file for complete search history.

(56) References Cited

U.S. PATENT DOCUMENTS

| | | | | |
|---|---|---|---|---|
| 4,380,024 A | * | 4/1983 | Olofsson | G02B 27/01 348/189 |
| 10,573,074 B1 | * | 2/2020 | Bull | G06T 3/20 |
| 10,943,368 B1 | * | 3/2021 | Ha | H04N 17/002 |
| 2015/0098617 A1 | * | 4/2015 | Choiniere | G06T 7/74 382/103 |
| 2017/0219693 A1 | * | 8/2017 | Choiniere | G01S 7/4808 |

(Continued)

FOREIGN PATENT DOCUMENTS

| | | |
|---|---|---|
| EP | 0597715 A1 | 5/1994 |
| JP | 2007147526 A * | 6/2007 |

(Continued)

OTHER PUBLICATIONS

Cobo, Alvaro, (2016) "Approach for Autonomous Landing on Moving Platforms Based on Computer Vision," [Master Thesis] International University of Andalucia.

*Primary Examiner* — Vu Le
*Assistant Examiner* — Jack Peter Kraynak
(74) *Attorney, Agent, or Firm* — Suiter Swantz IP

(57) ABSTRACT

A system and method utilizing an existing boresighted HUD and a camera to determine the transformational and rotational relationships between the camera image and the boresighted HUD image of an aircraft to properly orient the camera for landing operations. Known boresight features are identified in a HUD image and are related to the same boresight features in a camera image, and transformations are applied to align pixels in the camera image to the pixel locations of the boresight features in the HUD image. Object recognition algorithms may be employed to identify the boresight features in the camera image.

20 Claims, 4 Drawing Sheets

(56) References Cited

U.S. PATENT DOCUMENTS

2019/0220039 A1* 7/2019 Wu ........................ B64D 47/08
2020/0327696 A1* 10/2020 Habib ..................... G01S 17/86
2020/0349723 A1* 11/2020 Geva ...................... G06V 20/56

FOREIGN PATENT DOCUMENTS

KR    20170057510 A    5/2017
WO    WO-2018071979 A1 *    4/2018 ............. G01C 11/04

\* cited by examiner

AIRCRAFT CAMERA EXTRINSIC CALIBRATION USING HEAD-UP DISPLAY

BACKGROUND

Camera sensors for use on an aircraft for camera-based position estimation require precise alignment with the aircraft boresight during installation. Existing methods carefully measure the installation angles of the camera on the aircraft, but this is cumbersome and can lead to insufficient accuracy, especially for safe landing functions and autonomous operations. Efficient and accurate extrinsic calibration methods are needed to support camera-based aircraft position estimation.

SUMMARY

In one aspect, embodiments of the inventive concepts disclosed herein are directed to a system and method that utilizes an existing heads-up display (HUD) and a camera to determine the rotational relationship between the camera and the aircraft's boresight. Known boresight features are identified in a camera image, and transformations are applied to align pixels in the camera image to the known locations of the boresight features.

In a further aspect, object recognition algorithms are employed to identify the boresight features in the camera image.

It is to be understood that both the foregoing general description and the following detailed description are exemplary and explanatory only and should not restrict the scope of the claims. The accompanying drawings, which are incorporated in and constitute a part of the specification, illustrate exemplary embodiments of the inventive concepts disclosed herein and together with the general description, serve to explain the principles.

BRIEF DESCRIPTION OF THE DRAWINGS

The numerous advantages of the embodiments of the inventive concepts disclosed herein may be better understood by those skilled in the art by reference to the accompanying figures in which.

DETAILED DESCRIPTION

Figure 1:
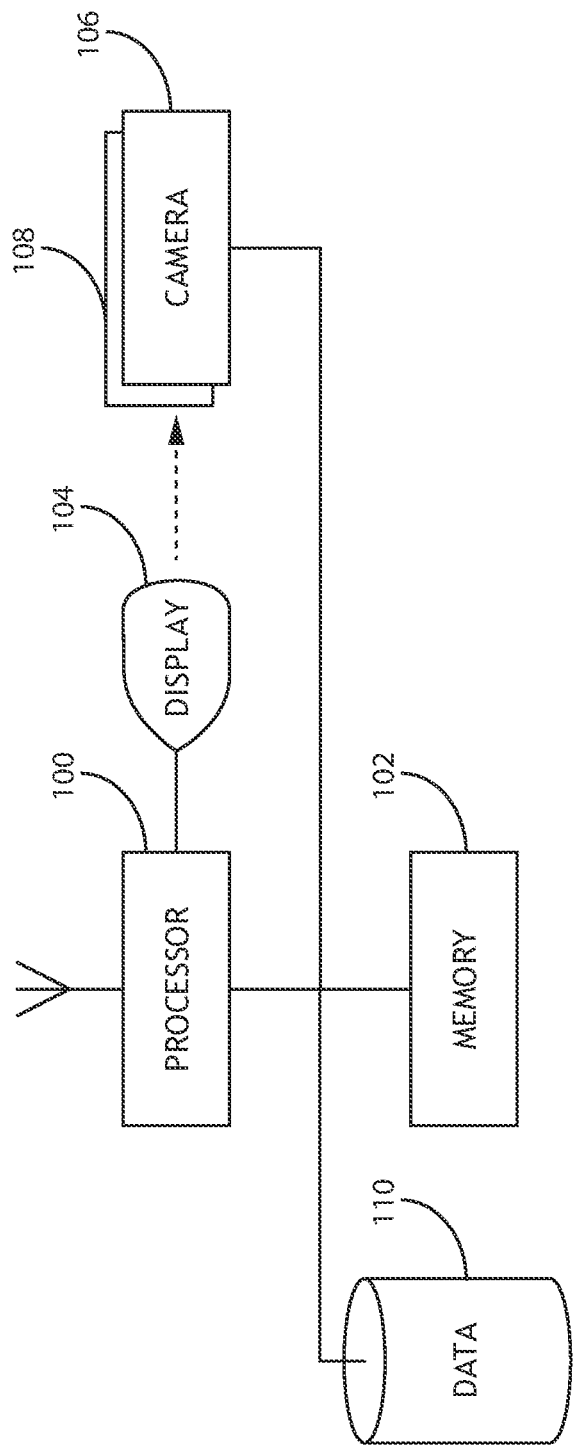
FIG. 1 shows a block diagram of a system according to an exemplary embodiment.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a system and method that utilizes an existing HUD and a camera to determine the rotational relationship between the camera and the aircraft's boresight. Known boresight features are identified in a camera image, and transformations are applied to align pixels in the camera image to the known locations of the boresight features. Object recognition algorithms may be employed to identify the boresight features in the camera image.

Embodiments of the present disclosure are useful for calibrating the rotational component of the camera installation relative to the vehicle body. The process to determine the rotational relationship between the camera and the vehicle involves a camera viewing through a HUD which has been previously boresighted to the vehicle and provides a collimated display of the boresight.

Referring to FIG. 1, a block diagram of a system according to an exemplary embodiment is shown. The system includes a processor 100, memory 102 connected to the processor for storing processor executable code, a calibrated HUD system 104 with a boresight and boresight features, and a camera 106 to be calibrated. The camera 106 and calibrated HUD system 104 each capture substantially corresponding images showing image features that may be correlated. The processor 100 utilizes boresight features identifiable in the calibrated HUD system 104 to establish a relationship between image features from the calibrated HUD system 104 and the camera 106. The processor 100 determines a set of transformations to be applied to images from the camera 106 to conform to the calibrated HUD system 104. In at least one embodiment, the set of transformations may be embodied in a matrix stored in a data storage element 110. In at least one embodiment, images from the calibrated HUD system 104 may be captured via a handheld camera 108.

Figure 2:
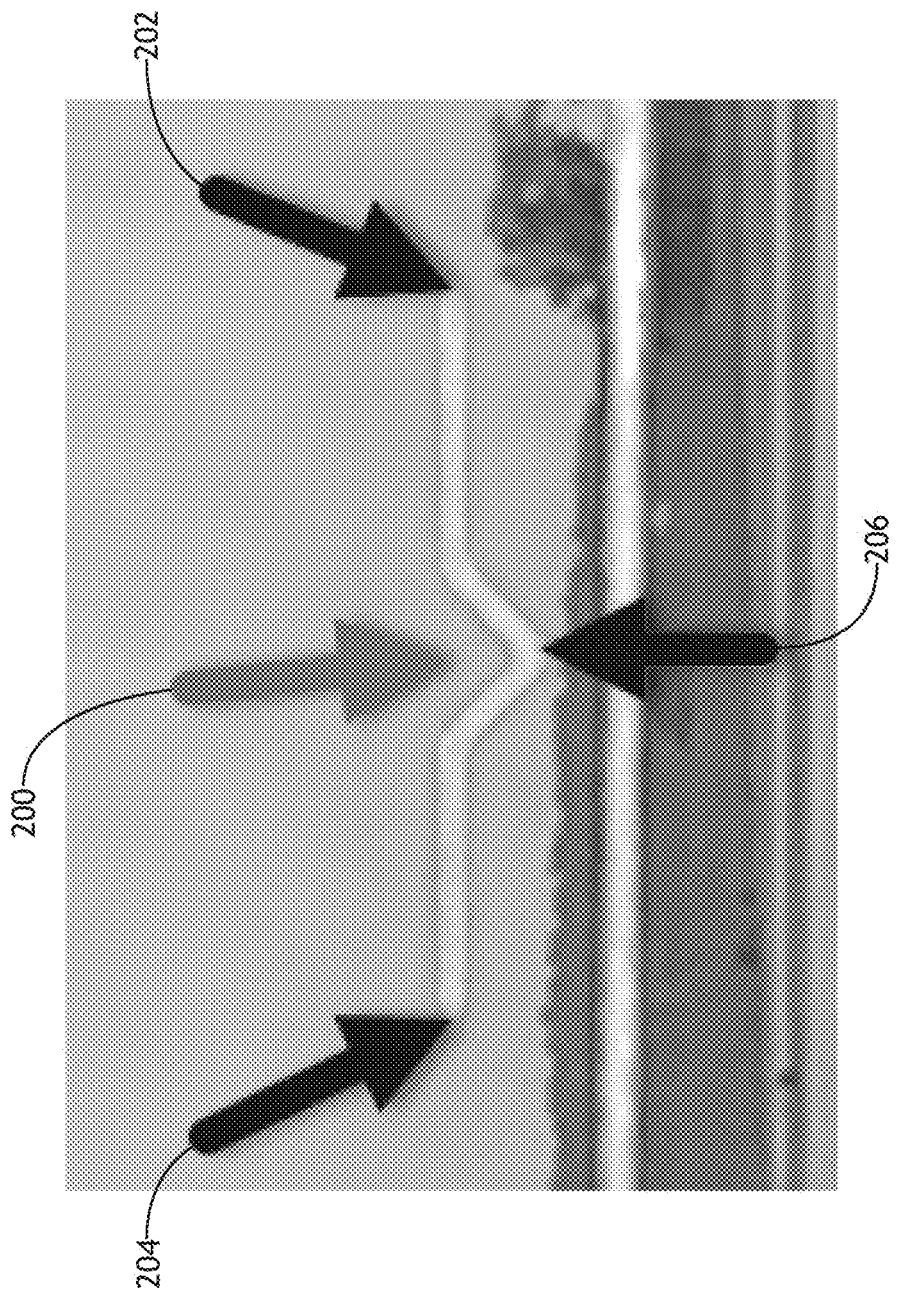
FIG. 2 shows a boresight image and features utilized in an exemplary embodiment.

Referring to FIG. 2, a boresight image and features utilized in an exemplary embodiment is shown. An exemplary boresight feature includes a plurality of reference points 202, 204, 206 that define the boresight 200 (which may be free of direct symbology). The reference points 202, 204, 206, as defined by specific pixel locations, may be used to define a set of vectors with respect to the boresight features and specific pixels within an image. It may be appreciated that, in at least one embodiment, three orthogonal vectors may be utilized to isolate a spatial relationship between the boresight features and the vehicle where it is installed, for example, via the inverse product of the set of vectors and identity vectors corresponding to a specific spatial vector. Such isolated spatial relationships define a transformation relating images captured through a corresponding calibrated HUD system to the orientation of the vehicle (such as an aircraft).

Figure 3:
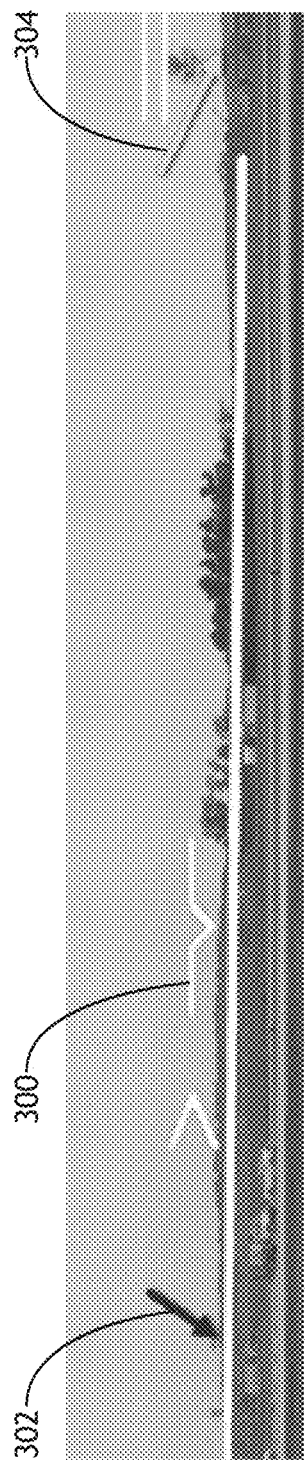
FIG. 3 shows a boresight and image features utilized in an exemplary embodiment.

Referring to FIG. 3, a boresight and image features utilized in an exemplary embodiment is shown. In a calibrated HUD system with a boresight, boresight features 300 are related to the orientation of a vehicle. Image features 302, 304 within an image frame including the boresight features are identified. A corresponding camera in need of calibration may also capture a substantially simultaneous image including the image features 302, 304. Based on the calculated transformation relating images captured through a calibrated HUD system to the orientation of the vehicle, a transformation may be determined to shift and rotate (align) subsequent images from the camera such that the images correspond to the orientation and alignment of the calibrated HUD system.

Figure 4:
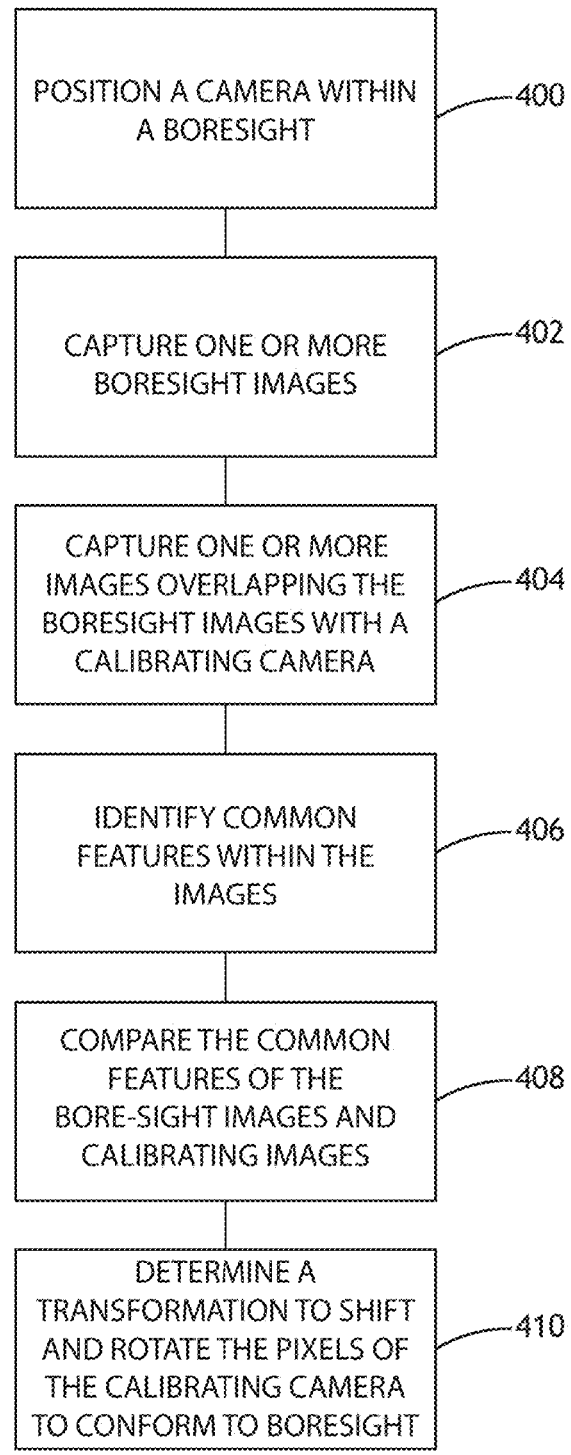
FIG. 4 shows a flowchart of a method according to an exemplary embodiment.

Referring to FIG. 4, a flowchart of a method according to an exemplary embodiment is shown. A camera is positioned 400 within the view of a HUD having a boresight with one or more calibrated boresight features. One or more boresight images are captured 402, either directly via the HUD system or via a handheld camera. One or more overlapping images are captured 404 via the camera being calibrated. Common reference elements are identified 406 between the boresight images and the overlapping images, and the common reference elements are compared 408. In at least one embodiment, a set of vectors are calculated referencing the boresight features to exterior features in the images. Such vectors may be determined by identifying specific coordinates within the images and calculating orthogonal vectors with reference to features in the boresight. The vectors may be related to the actual body of the vehicle via known calibration metrics of the HUD system to determine 410 a transformation matrix associating exterior image features to the boresight.

In at least one embodiment, the exterior features are identified by a user. Alternatively, or in addition, object recognition algorithms (such as edge detection) may be employed to identify sufficiently distinct features to allow for near pixel level specificity. It may be appreciated that exterior features should be sufficiently distant ("at infinity"), viewable both by the HUD system and the installed camera, and possess sharp, distinctly defined edges.

Embodiments of the present disclosure enable an image shot through a HUD using any standard camera and a simultaneous image shot through a camera being calibrated to utilize the know calibration integrity of the HUD. The rotation between the HUD and the calibrating camera are related, as well as the rotation between the HUD and the vehicle to determine the final rotation between the calibrating camera and the vehicle. Such system allows for quick and arbitrary installation of a camera system on an aircraft with installation to be characterized. It does not require precise installation measurement.

It is believed that the inventive concepts disclosed herein and many of their attendant advantages will be understood by the foregoing description of embodiments of the inventive concepts disclosed, and it will be apparent that various changes may be made in the form, construction, and arrangement of the components thereof without departing from the broad scope of the inventive concepts disclosed herein or without sacrificing all of their material advantages; and individual features from various embodiments may be combined to arrive at other embodiments. The form herein before described being merely an explanatory embodiment thereof, it is the intention of the following claims to encompass and include such changes. Furthermore, any of the features disclosed in relation to any of the individual embodiments may be incorporated into any other embodiment.

What is claimed is:

1. A computer apparatus comprising:
   a camera to be calibrated; and
   at least one processor in data communication with the camera and a memory storing processor executable code for configuring the at least one processor to:
   receive one or more boresight images from a handheld camera;
   capture one or more images from the camera overlapping the one or more boresight images;
   identify common features within the one or more images and one or more boresight images;
   identify a plurality of reference points defined by specific pixel locations;
   define a set of three orthogonal vectors based on the reference points, the set of three orthogonal vectors isolating a spatial relationship between the common features in the boresight and a vehicle including the computer apparatus;
   compare the common features;
   determine one or more transformations to apply to the one or more images based on comparison of common features; and
   store the transformations for later application to future images from the camera.

2. The computer apparatus of claim 1, wherein identifying the common features comprises receiving a user input indicating a location of the image features.

3. The computer apparatus of claim 1, wherein identifying the common features comprises object recognition algorithms.

4. The computer apparatus of claim 1, wherein the at least one processor is further configured to identify boresight features by identifying three points within the boresight to determine a camera orientation.

5. The computer apparatus of claim 4, wherein determining one or more transformations comprises establishing a vector relationship between the common features and the boresight features.

6. The computer apparatus of claim 1, wherein determining one or more transformations comprises generating a 3×3 matrix associated with the camera.

7. The computer apparatus of claim 1, wherein determining one or more transformations comprises:
calculate cross-products of the plurality of vectors.

8. A method comprising:
capturing one or more boresight images via a handheld camera;
capturing one or more images from a camera to be calibrated overlapping the one or more boresight images;
identifying common features within the one or more images and one or more boresight images;
identifying a plurality of reference points defined by specific pixel locations;
defining a set of three orthogonal vectors based on the reference points, the set of three orthogonal vectors isolating a spatial relationship between the common features in the boresight and a vehicle including the computer apparatus;
comparing the common features;
determining one or more transformations to apply to the one or more images based on comparison of common features; and
storing the transformations for later application to future images from the camera.

9. The method of claim 8, wherein identifying the common features comprises receiving a user input indicating a location of the image features.

10. The method of claim 8, wherein identifying the common features comprises object recognition algorithms.

11. The method of claim 8, further comprising identifying boresight features by identifying three points within the boresight to determine a camera orientation.

12. The method of claim 11, wherein determining one or more transformations comprises establishing a vector relationship between the common features and the boresight features.

13. The method of claim 8, wherein determining one or more transformations comprises generating a 3×3 matrix associated with the camera orientation.

14. The method of claim 8, wherein determining one or more transformations comprises:
calculate cross-products of the plurality of vectors.

15. A system comprising:
a boresight;
a camera to be calibrated; and
at least one processor in data communication with the camera and a memory storing processor executable code for configuring the at least one processor to:
receive one or more boresight images via a handheld camera;
identify boresight features by identifying three points within the boresight to determine a camera orientation;
capture one or more images from the camera overlapping the one or more boresight images;
identify common features within the one or more images and one or more boresight images;
identify a plurality of reference points defined by specific pixel locations;
define a set of three orthogonal vectors based on the reference points, the set of three orthogonal vectors isolating a spatial relationship between the common features in the boresight and a vehicle including the computer apparatus;
compare the common features;
determine one or more transformations to apply to the one or more images based on comparison of common features; and
store the transformations for later application to future images from the camera.

16. The system of claim 15, wherein identifying the common features comprises receiving a user input indicating a location of the image features.

17. The system of claim 15, wherein identifying the common features comprises object recognition algorithms.

18. The system of claim 15, wherein determining one or more transformations comprises establishing a vector relationship between the common features and the boresight features.

19. The system of claim 15, wherein determining one or more transformations comprises generating a 3×3 matrix associated with the camera orientation.

20. The system of claim 15, wherein determining one or more transformations comprises:
calculate cross-products of the plurality of vectors.

* * * * *